United States Patent
Gronowicz, Jr.

[11] Patent Number: 5,767,449
[45] Date of Patent: Jun. 16, 1998

[54] METHOD AND APPARATUS FOR GROUNDING A RFI/EMI SHIELDING TUBE

[75] Inventor: William Gronowicz, Jr., Holly, Mich.

[73] Assignee: Yazaki Corporation, Tokyo, Japan

[21] Appl. No.: 677,088

[22] Filed: Jul. 9, 1996

[51] Int. Cl.$^6$ .................................................. H02G 15/02
[52] U.S. Cl. ........................................ 174/78; 439/98
[58] Field of Search ................................ 174/78, 74 A, 174/93; 439/98, 99; 29/862, 871, 516, 517, 518

[56] References Cited

U.S. PATENT DOCUMENTS

| | | | |
|---|---|---|---|
| 3,280,246 | 10/1966 | Lawson et al. | 174/88 X |
| 3,315,024 | 4/1967 | Ball | 174/75 X |
| 4,140,870 | 2/1979 | Volkers et al. | 174/78 |
| 4,164,621 | 8/1979 | Silva | 174/78 |
| 4,271,330 | 6/1981 | Watine et al. | 174/84 R X |
| 5,228,868 | 7/1993 | Igarashi et al. | 439/465 X |
| 5,432,301 | 7/1995 | Gehring | 174/78 |

FOREIGN PATENT DOCUMENTS

| | | | |
|---|---|---|---|
| 3329871 | 7/1985 | Germany | 174/78 |
| 33863 | 3/1989 | Japan | 174/78 |

OTHER PUBLICATIONS

IBM Technical Disclosure Bulletin "Shielded Cable Termination", Nov. 1973.

AMP Product Guide, Jun. 1991.

*Primary Examiner*—Kristine Kincaid
*Assistant Examiner*—Chau N. Nguyen
*Attorney, Agent, or Firm*—Young & Basile P.C.

[57] ABSTRACT

Abstract of the Disclosure A collar for providing a grounding connection for a tube of electrically conductive fabric used to shield a cable from electromagnetic interference and/or radio frequency interference. The collar has an inner sleeve which fits around the cable and an outer sleeve which slides over the inner sleeve so that the shielding tube is sandwiched between the two sleeves. An electrically conductive ring around the inner circumference of the outer sleeve is pressed into contact with the shielding tube. A terminal extends from the ring for connection to ground. In an alternative embodiment of the invention, an electrical connector is formed integrally with the outer sleeve.

15 Claims, 2 Drawing Sheets

5,767,449

METHOD AND APPARATUS FOR GROUNDING A RFI/EMI SHIELDING TUBE

FIELD OF THE INVENTION

The present invention relates to electrically conductive fabrics used to shield electrical cables from radio frequency and electromagnetic interference, and more particularly to a method and apparatus for electrically grounding tubes made from such fabric.

BACKGROUND OF THE INVENTION

It is often necessary to shield electrical conductors against electromagnetic interference (EMI) and/or radio frequency interference (RFI). These types of interference can be generated by a wide variety of electrical components, and can disrupt the electrical signals carried by an unshielded conductor.

It is well-known to shield a conductor such as a cable by surrounding it with a woven or braided fabric composed at least partially of electrically conductive fibers. Such a fabric is taught in U.S. Pat. No. 4,684,762, titled "Shielding Fabric", the disclosure of which is incorporated herein by reference. As indicated in the '762 patent, a fabric having effective RFI/EMI shielding properties may be woven from yarns comprising various blends of conductive and non-conductive fibers. Conductive fibers used in shielding fabrics may be made from metallic wires, carbon, graphite, or nonconductive polymers such as nylon coated in a conductive metal such as silver, copper or nickel. Such fabrics may be woven in a tubular shape for placement around a cable or other elongated conductor.

To be fully effective, a shielding tube should be connected to an electrical ground. The '762 patent discloses a shielding tube having one or more grounding wires which are incorporated into the woven fabric as warp strands and extend from the tube for connection to a grounding means.

SUMMARY OF THE INVENTION

It is an object of the present invention to provide a collar for electrically grounding an RFI/EMI-resistant shielding tube surrounding a cable. It is a further objective of the invention to provide a collar which is easily applied to a shielding tube, ensures a reliable electrical connection between the collar and the tube, and does so without applying potentially damaging pressure to the cable.

The above objectives are achieved by a collar comprising a tubular outer sleeve having electrically conductive means disposed on its inner surface and an inner sleeve sized to slide into the hollow interior of the outer sleeve, fitting therein with only a small amount of clearance between the two sleeves. The two sleeves are assembled in this fashion with a portion of the shielding tube sandwiched between the inner sleeve and outer sleeves, the clearance between the sleeves being tight enough so that the shielding tube is urged firmly into contact with the conductive means.

Conductive strands exposed on the surface of the shielding tube are thus placed in electrical contact with the conductive means, and a terminal connected to the conductive means and extending from the outer sleeve provides a point for connection to a grounding wire.

According to a feature of the invention, the outer sleeve and the inner sleeve are shaped to fit into cooperating, detented engagement with one another to retain the inner sleeve inside the outer sleeve.

According to a further feature of the invention, the outer sleeve has inwardly projecting rims adjacent either end thereof to define openings having inside diameters smaller than the outside diameter of the inner sleeve. The inner sleeve is retained securely between the rims when inserted within the outer sleeve.

According to a still further feature of the invention, the conductive means is a ring encircling the inner surface of the outer sleeve and projecting inwardly therefrom, and the inner sleeve has a groove extending around its outer surface which receives the ring when the inner sleeve is fully inserted into the outer sleeve. Engagement between the ring and the groove provides for positive contact between the shielding tube and the ring, and also provides a positive "snap fit" to indicate proper, detented engagement between the two sleeves.

According to yet another feature of the invention, the conductive means and the terminal are formed integrally with one another and are insert molded into the outer sleeve. This construction provides for efficient manufacture of the outer sleeve.

According to another feature of the invention, the outer sleeve is formed integrally with an electrical connector used to terminate the wires of the cable which the shielding tube surrounds. A connector with an integral grounding collar may provide manufacturing and assembly advantages in applications wherein the shielding tube extends to a point immediately adjacent the electrical connector.

According to a still further feature of the invention, the grounding terminal extends into the electrical connector and so is connected to ground when the electrical connector is connected with its mating connector.

According to a still further feature of the invention, the collar is mounted to a shielding tube by placing the inner sleeve over the end of the shielding tube, folding the end of the tube back over the outside of the inner sleeve, placing the outer sleeve over the inner sleeve to sandwich the tube between the two sleeves and urge the tube into contact with the conductive means, and connecting the terminal to an electrical ground.

DETAILED DESCRIPTION OF THE PREFERRED EMBODIMENT

Figure 1:
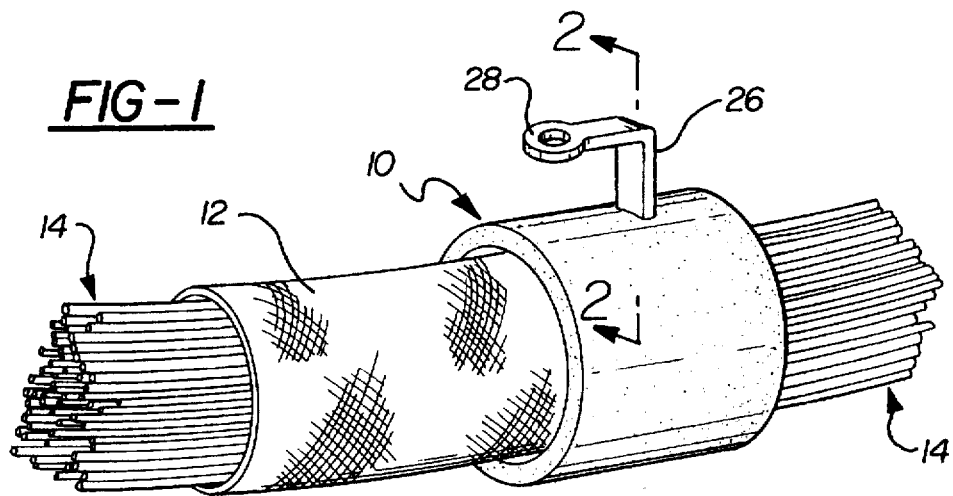
FIG. 1 is a perspective view of a shielding tube surrounding a cable and having a grounding collar according to the present invention mounted thereto.

Referring to FIG. 1, a grounding collar 10 according to the present invention is shown connected to a shielding tube 12 which surrounds a multi-wire electrical cable 14. The grounding collar provides a means for connecting the shielding tube to electrical ground so as to improve the effectiveness of the shielding tube in protecting the cable from electromagnetic and radio frequency interference. Shielding tube 12 is woven from one or more yarns composed at least partially of electrically conductive fibers, as is known in the art.

Figure 2:
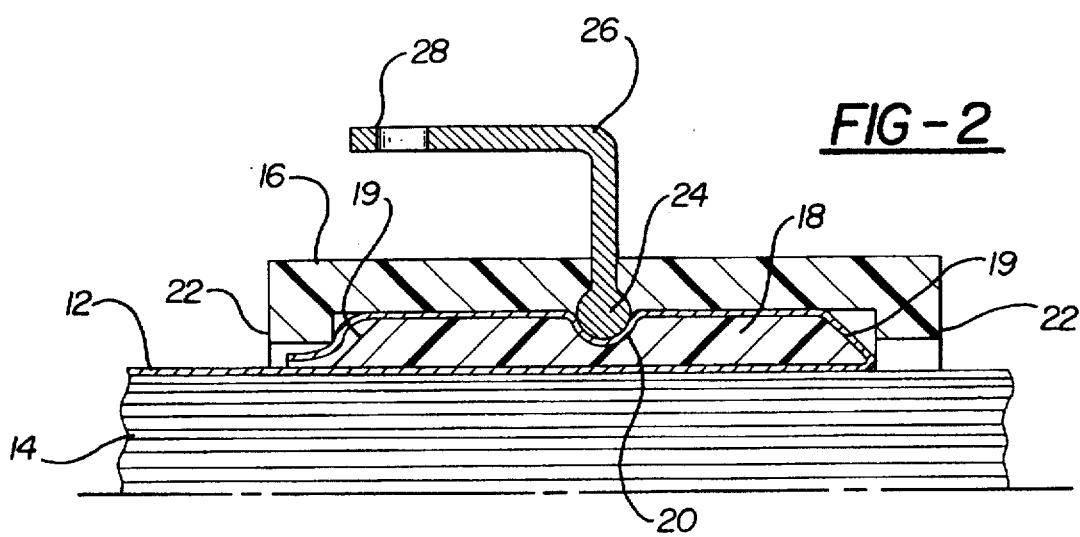
FIG. 2 is cross-section taken along line 2—2 in FIG. 1.
Figure 3:
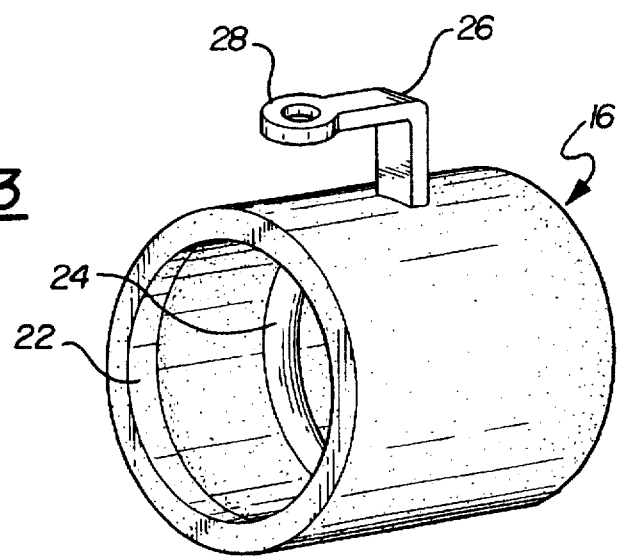
FIG. 3 is a perspective view of an outer sleeve according to the present invention.
Figure 4:
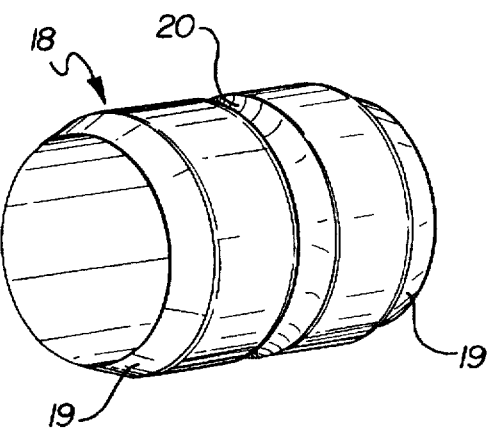
FIG. 4 is a perspective view of an inner sleeve according to the present invention.

Referring to FIG. 2, grounding collar 10 comprises an outer sleeve 16 and a smaller inner sleeve 18. Sleeves 16, 18 may be of any cross-sectional shape as required to match the shape of the cable or conductor with which they are used, and in the preferred embodiment depicted are circular in cross-section. The outer diameter of inner sleeve 18 is slightly smaller than the inner diameter of outer sleeve 16 so that the inner sleeve fits inside the outer sleeve with only a small amount of clearance therebetween. Inner and outer sleeves 18, 16 are preferably formed from a plastic material, and the overall size of the two components is determined by the diameter of the cable with which they are to be used.

Inner sleeve 18 is of sufficient inside diameter to slide easily over cable 14 without squeezing the cable, and has bevels 19 formed around its exterior at either end. A shallow, circumferential groove 20 is formed in the outer surface of inner sleeve 18, while the inner surface of the sleeve is substantially smooth.

Outer sleeve 16 is of a greater axial length than inner sleeve 18, and has inwardly projecting rims 22 adjacent either end to form openings smaller in diameter than the outside diameter of the inner sleeve. An electrically conductive ring 24 is disposed on the inner surface of outer sleeve 16 and projects slightly inward from the inner surface. A grounding terminal 26 is connected to ring 24 and projects radially outward through the wall of outer sleeve 16. The distal end of grounding terminal 26 may be formed as an eyelet 28 or some other shape to facilitate connection with a grounding wire (not shown).

In the preferred embodiment depicted, ring 24 and grounding terminal 26 are formed as an integral unit from copper or some other metal and are subsequently molded in place within outer sleeve 16 by an insert molding process, as is well known in the art.

Insert molding, in general, involves placing a preformed element within a mold cavity and injecting a fluid plastic material into the mold cavity to at least partially surround the element. When the plastic has hardened, the preformed element is embedded in the plastic and so is firmly structurally connected to the rest of the molded part. In this case, the integrally formed ring 24 and grounding terminal 26 are positioned within the mold (not shown) used to form outer sleeve 16 so as to be embedded in place within the outer sleeve as shown after the plastic is injected into the mold.

Grounding collar 10 is connected to an end of shielding tube 12 by inserting the end of the tube through inner sleeve 18, folding the end of the tube back over the outer surface of the inner sleeve, and then sliding outer sleeve 16 over the tube and the inner sleeve until the inner sleeve snaps into detented engagement with the outer sleeve between rims 22, thus sandwiching the tube end between the surfaces of the two sleeves. Bevels 19 on the ends of inner sleeve 18 make it easier to overcome the physical interference between the outside diameter of the inner sleeve and the inside diameter of rim 22 when sliding outer sleeve 16 over the inner sleeve.

By attaching grounding collar 10 to shielding tube 12 in this manner, the shielding tube is wrapped completely around inner sleeve 18, as seen in FIG. 2, with the result that the tube is clamped between the two sleeves more securely than if the tube merely passed over the exterior of the inner sleeve. Note that in order to fold shielding tube 12 back over inner sleeve 18, it may be necessary to slit the end of shielding tube 12 at one or more locations around its circumference.

When inner sleeve 18 is properly positioned within outer sleeve 16, ring 24 projects into engagement with groove 20. The relative diameters of ring 24 and groove 20 are such as to create an interference fit therebetween to ensure that shielding tube 12 is pressed firmly into contact with the ring around the entire circumference of the tube. This ensures good electrical contact between the conductive fibers of shielding tube 12 and ring 24 without applying any pressure to cable 14.

Figure 5:
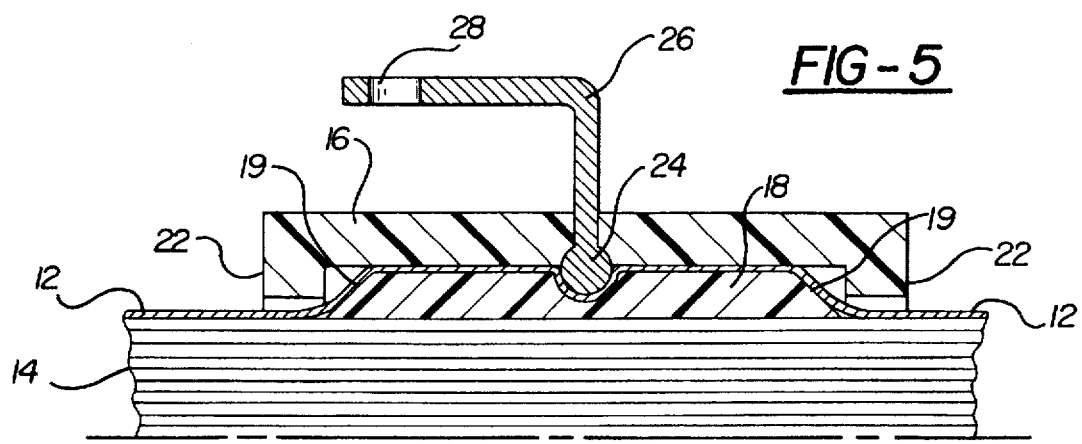
FIG. 5 is a cross-section of the invention grounding collar connected to a shielding tube at a position away from the end of the tube.

Grounding collar 10 may also be connected to shielding tube 12 at a location away from the end of the tube, as seen in FIG. 5. This is accomplished by inserting inner sleeve 18 into the interior of shielding tube 12 and sliding it to the desired location along the tube, then sliding outer sleeve 16 over the exterior of the tube and snapping it into engagement with the inner sleeve as described above.

Figure 6:
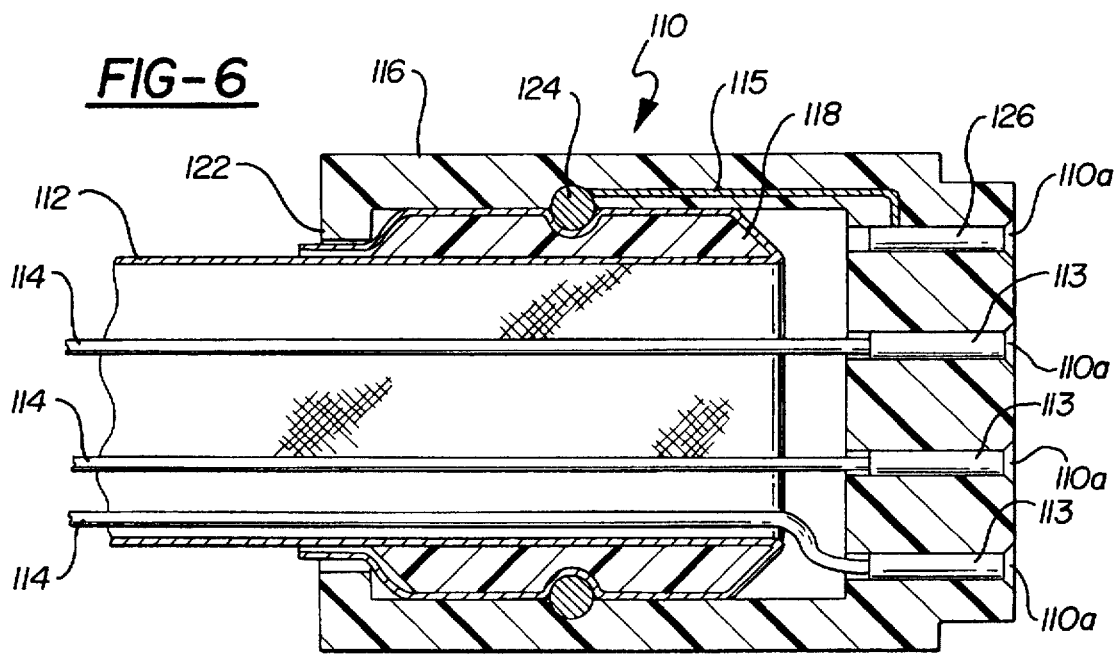
FIG. 6 is a cross-section of an alternative embodiment of the present invention wherein the outer sleeve is integral with an electrical connector.

FIG. 6 shows an alternative embodiment of the invention wherein a grounding collar is combined with an electrical connector 110 used for terminating the wires 114 of a cable and connecting the wires with some other electrical component. Electrical connector 110 is preferably injection molded plastic and has a plurality of apertures 110a at a first end which communicate with the hollow interior of the connector and retain wire terminals 113 as is well known in the art. The opposite end of electrical connector 110 forms an outer sleeve 116 having an inwardly projecting rim 122 adjacent its open end to form a reduced diameter section. An electrically conductive ring 124 encircles the inner surface of outer sleeve 116 and projects inwardly therefrom. A grounding lead 115 is buried within the wall of electrical connector 110 and connects ring 124 with a grounding terminal 126 retained within one of apertures 110a. An inner sleeve 118 is substantially identical to that used in the first embodiment of the invention, having bevelled ends and a circumferential groove, and fits into the interior of outer sleeve 116 to be retained therein and urge shielding tube 112 into contact with ring 124. When electrical connector 110 is connected to a mating connector (not shown), grounding terminal 126 makes contact with an electrically grounded lead of the mating connector.

As is apparent from the above description read in conjunction with the drawings, the invention grounding collar provides a simple, easily applied means for connecting a shielding tube surrounding a cable to electrical ground. The collar ensures good electrical contact with the shielding tube, and does so without applying any possibly damaging pressure to the protected cable.

Whereas a preferred embodiment of the invention has been illustrated and described in detail, it will be apparent that various changes may be made in the disclosed embodiment without departing from the scope or spirit of the invention.

What is claimed is:

1. A grounding collar for connecting an electrically conductive shielding tube to ground, the collar comprising:
   an outer sleeve having a hollow interior and an inner surface;
   electrically conductive means disposed on the inner surface of the outer sleeve;
   a hollow inner sleeve having an outer surface and insertable into the interior of the outer sleeve to sandwich the shielding tube between the inner sleeve outer surface and the outer sleeve inner surface and thereby urge the shielding tube into contact with the electrically conductive means, the inner and outer sleeves having cooperating means for fitting into cooperating, detented engagement with one another upon insertion of the inner sleeve into the outer sleeve, said engagement by itself retaining the inner sleeve inside the outer sleeve and urging the shielding tube into contact with the electrically conductive means; and a grounding terminal in electrical connection with the conductive means and connectable to ground.

2. A grounding collar according to claim 1 wherein the cooperating means comprises first and second inwardly projecting rims on the outer sleeve adjacent either end thereof to define openings having inside diameters smaller than an outside diameter of the inner sleeve, the inner sleeve being retained between the first and second rims when inserted within the outer sleeve.

3. A grounding collar according to claim 2 wherein the cooperating means further comprises bevelled ends on the inner sleeve to aid insertion of the inner sleeve between the rims of the outer sleeve.

4. A grounding collar according to claim 1 wherein:

the conductive means is a ring extending substantially completely around the outer sleeve inner surface and projecting inwardly from the inner surface; and the inner sleeve has a groove extending substantially completely around said outer surface for receiving the ring when the inner sleeve is within the outer sleeve.

5. A grounding collar according to claim 1 wherein the conductive means and the grounding terminal are formed integrally with one another and are insert molded into the outer sleeve.

6. A grounding collar according to claim 1 wherein the outer sleeve is formed integrally with an electrical connector for terminating one or more wires surrounded by the shielding tube.

7. A grounding collar according to claim 6 wherein the grounding terminal extends into the electrical connector.

8. A method of connecting an electrically conductive shielding tube to ground comprising the steps of:

providing a hollow outer sleeve having an inner surface with electrically conductive means disposed thereon, and a hollow inner sleeve slidable within the outer sleeve and having an outer surface, at least one of the sleeves having means for maintaining the inner and outer sleeves in detented engagement with one another when the inner sleeve is slid inside of the outer sleeve;

placing the hollow inner sleeve over the exterior of the shielding tube;

folding a portion of the shielding tube back over the outer surface of the inner sleeve;

sliding the outer sleeve over the inner sleeve and the shielding tube to sandwich the folded-back portion of the shielding tube between the inner sleeve and the outer sleeve, place the electrically conductive means in electrical contact with the folded-back portion of the shielding tube, and place the inner and outer sleeves in detented engagement with one another; and connecting the conductive means to an electrical ground.

9. The method of claim 8 wherein the conductive means substantially encircles the outer sleeve inner surface and projects inwardly from the inner surface and the inner sleeve has a groove extending around said outer surface, and the step of sliding the outer sleeve over the inner sleeve and the shielding tube causes the ring to fit into the groove.

10. The method of claim 8 wherein the step of connecting the conductive means to the electrical ground comprises connecting a grounding terminal in electrical contact with the conductive means to the electrical ground.

11. A grounding collar for connecting an electrically conductive shielding tube to ground, the collar comprising:

an outer sleeve having a hollow interior, an inner diameter and an inner surface;

electrically conductive means exposed on the inner surface of the outer sleeve;

a grounding terminal formed integrally with the conductive means and connectable to ground, the conductive means and the grounding terminal being insert molded into the outer sleeve; and a hollow inner sleeve having an outer diameter and an outer surface and being insertable into the interior of the outer sleeve to sandwich the shielding tube between the inner sleeve outer surface and the outer sleeve inner surface, the outer diameter of the inner sleeve being slightly smaller than the inner diameter of the outer sleeve such that the shielding tube is urged into contact with the electrically conductive means solely by insertion of the inner sleeve into the interior of the outer sleeve.

12. A grounding collar for connecting an electrically conductive shielding tube to ground, the collar comprising:

an outer sleeve having a hollow interior and an inner surface;

an electrically conductive ring extending substantially completely around the outer sleeve inner surface and projecting inwardly from the inner surface;

a hollow inner sleeve having an outer surface and insertable into the interior of the outer sleeve to sandwich the shielding tube between the inner sleeve outer surface and the outer sleeve inner surface and thereby urge the shielding tube into contact with the ring, the inner sleeve having a groove extending substantially completely around said outer surface for receiving the ring when the inner sleeve is within the outer sleeve; and a grounding terminal in electrical connection with the ring and connectable to ground.

13. An electrical connector for terminating one or more wires surrounded by an electrically conductive shielding tube and having grounding means for connecting the shielding tube to ground, the grounding means comprising:

an outer sleeve formed integrally with the electrical connector and having a hollow interior and an inner surface;

electrically conductive means disposed on the inner surface of the outer sleeve;

a hollow inner sleeve having an outer surface and insertable into the interior of the outer sleeve to sandwich the shielding tube between the inner sleeve outer surface and the outer sleeve inner surface and thereby urge the shielding tube into contact with the electrically conductive means, the inner and outer sleeves having cooperating means for fitting into cooperating, detented engagement with one another to retain the inner sleeve inside the outer sleeve; and a grounding terminal connection with the conductive means and connectable to ground.

14. An electrical connector according to claim 13 wherein the grounding terminal extends into the electrical connector for connection to ground.

15. A grounding collar for connecting an electrically conductive shielding tube to ground, the collar comprising:

an outer sleeve having a hollow interior, an inner surface and first and second inwardly projecting rims adjacent respective first and second ends of the outer sleeve, the rims defining openings adjacent the first and second ends;

electrically conductive means disposed on the inner surface of the outer sleeve;

a hollow inner sleeve having an outer surface and an outer diameter larger than the openings, the inner sleeve insertable into the interior of the outer sleeve between the first and second rims to sandwich the shielding tube between the inner sleeve outer surface and the outer sleeve inner surface and thereby urge the shielding tube into contact with the electrically conductive means, the inner sleeve having bevelled ends to aid insertion of the inner sleeve between the first and second rims of the outer sleeve; and a grounding terminal in electrical connection with the conductive means and connectable to ground.

* * * * *